US012769147B1

(12) United States Patent
Clement

(10) Patent No.: US 12,769,147 B1
(45) Date of Patent: Oct. 20, 2026

(54) COMPACT COLLAPSIBLE EYEWEAR SYSTEM

(71) Applicant: Kristin Wedgwood Clement, Norwich, VT (US)

(72) Inventor: Kristin Wedgwood Clement, Norwich, VT (US)

( * ) Notice: Subject to any disclaimer, the term of this patent is extended or adjusted under 35 U.S.C. 154(b) by 224 days.

(21) Appl. No.: 18/503,737

(22) Filed: Nov. 7, 2023

(51) Int. Cl.
*G02C 5/00* (2006.01)
*G02C 5/04* (2006.01)
*G02C 5/20* (2006.01)
*G02C 5/22* (2006.01)
*G04B 37/12* (2006.01)

(52) U.S. Cl.
CPC ............. *G02C 5/006* (2013.01); *G02C 5/045* (2013.01); *G02C 5/20* (2013.01); *G02C 5/22* (2013.01); *G04B 37/127* (2013.01)

(58) Field of Classification Search
CPC .......... G02C 5/20; G02C 5/006; G02C 11/02; G02C 5/045
USPC ..................................... 351/63, 65, 116, 121
See application file for complete search history.

(56) References Cited

U.S. PATENT DOCUMENTS 22,485 A * 1/1859 Burt ....................... G02C 5/006 351/63
1,915,707 A 6/1933 Wingate
1,936,319 A 11/1933 Wingate
1,953,995 A 4/1934 Tanasso et al.
1,970,079 A * 8/1934 Eglinton .................. G02C 5/08 351/63
1,975,894 A * 10/1934 Eglinton ................ G02C 5/006 351/63
2,275,999 A 3/1942 Strauss
2,307,419 A * 1/1943 Ncneill .................... G02C 5/20 351/44
2,419,303 A 4/1947 Vasey
2,753,762 A 7/1956 Dorgelys
2,814,968 A 12/1957 Nixon, Jr.
2,975,426 A 3/1961 Rabb
4,617,698 A * 10/1986 Drlik .................... G02C 5/2245 351/113
4,681,410 A * 7/1987 Paulsen .................. G02C 5/143 351/63

(Continued)

FOREIGN PATENT DOCUMENTS

CH 297472 A * 3/1954 ............... G02C 5/08
DE 19604936 A1 * 8/1997 ........... A45F 5/1541

(Continued)

OTHER PUBLICATIONS

Paper Glass [online]. paperglass.jp. [retrieved on Jun. 7, 2023] Retrieved from the Internet <https://www.paperglass.jp> 11 pages.

*Primary Examiner* — Zachary W Wilkes
(74) *Attorney, Agent, or Firm* — Thomas G. Ference

(57) ABSTRACT

A collapsible eyewear system, the system includes two lenses, a collapsible nose bridge, a pair of contracting temple members, a pair of temple hinges, and a temple gap. When contracting temple members are contracted, the temple members fit within the temple gap. When fully collapsed, the eyewear is no more than twice the thickness of the lenses and the area of one lens with surrounding frame. The collapsed lenses and temple members may be stored in a holding case that can carried within the user's pocket or worn as a watch, necklace, etc.

7 Claims, 23 Drawing Sheets

(56) References Cited

U.S. PATENT DOCUMENTS

| | | | | |
|---|---|---|---|---|
| 4,720,186 | A | 1/1988 | Douillard | |
| 4,820,035 | A | 4/1989 | Kanda | |
| 4,887,896 | A | 12/1989 | Akagi | |
| 5,065,373 | A | 11/1991 | Alcantara Maia | |
| 5,448,317 | A | 9/1995 | Huang | |
| 5,532,766 | A | 7/1996 | Mateer et al. | |
| 5,593,024 | A * | 1/1997 | Seiler | G02C 3/003 206/5 |
| 5,638,146 | A | 6/1997 | Nannini | |
| 5,640,218 | A | 6/1997 | Kanda | |
| 5,929,966 | A * | 7/1999 | Conner | G02C 5/006 351/63 |
| 5,984,471 | A | 11/1999 | Tredoulat | |
| 6,409,335 | B1 | 6/2002 | Lipawsky | |
| 6,494,573 | B1 | 12/2002 | Huang | |
| 6,752,496 | B2 | 6/2004 | Conner | |
| 6,783,236 | B2 * | 8/2004 | Chou | G02C 5/20 2/454 |
| 7,033,020 | B2 | 4/2006 | Sawhney | |
| 7,566,127 | B2 | 7/2009 | Breda et al. | |
| 7,637,610 | B2 * | 12/2009 | Graffia | G02C 5/08 351/63 |
| 7,905,591 | B2 | 3/2011 | Strobel | |
| 8,376,544 | B2 * | 2/2013 | Porter | G02C 5/045 351/63 |
| 9,069,189 | B2 | 6/2015 | Shalon | |
| 9,081,209 | B2 | 7/2015 | Shalon | |
| 9,726,902 | B2 | 8/2017 | Shalon | |
| 10,025,113 | B2 | 7/2018 | Shalon | |
| 10,048,510 | B2 | 8/2018 | Carlon | |
| 10,114,230 | B2 | 10/2018 | Porter | |
| 10,156,735 | B2 | 12/2018 | Johnson | |
| 10,203,517 | B2 | 2/2019 | Greenberg | |
| 11,422,386 | B2 | 8/2022 | Johnson et al. | |
| 2004/0100615 | A1 | 5/2004 | Connor | |
| 2006/0092373 | A1 | 5/2006 | Gao | |
| 2008/0055539 | A1 * | 3/2008 | Graffia | G02C 5/006 351/158 |
| 2009/0190088 | A1 | 7/2009 | Strobel | |
| 2010/0073626 | A1 * | 3/2010 | Engstrom | G02C 3/04 351/158 |
| 2011/0037939 | A1 | 2/2011 | Pulvino et al. | |
| 2012/0162597 | A1 * | 6/2012 | Porter | G02C 5/045 351/63 |
| 2016/0025999 | A1 * | 1/2016 | Chen | G02C 11/12 351/63 |
| 2016/0091731 | A1 * | 3/2016 | Zhou | G02C 5/08 351/63 |
| 2016/0109722 | A1 * | 4/2016 | McKegg | G02C 5/2263 351/63 |
| 2016/0246070 | A1 | 8/2016 | Johnson | |
| 2020/0012122 | A1 | 1/2020 | Johnson et al. | |
| 2022/0099997 | A1 | 3/2022 | Kaufmann et al. | |
| 2023/0244088 | A1 | 8/2023 | Lyman et al. | |

FOREIGN PATENT DOCUMENTS

| | | | | |
|---|---|---|---|---|
| EP | 1046942 | B1 | 12/2003 | |
| GB | 421661 | A * | 12/1934 | G02C 5/08 |

* cited by examiner

COMPACT COLLAPSIBLE EYEWEAR SYSTEM

FIELD

This patent application generally relates to an eyewear system. More specifically, it relates to a compact, collapsible eyewear system where the glasses collapse to the essentially the area of one lens.

BACKGROUND

Eye glasses have been around for hundreds of years. Many attempts have been made to provide a compact way of storing and carrying the glasses. Although these eye glass storage systems have offered varying levels of compactness, they have still have not achieved the storage area of essentially the area of one lens for glasses that include temple supports.

The present invention aims to provide for the ultimate compact eyewear system where the storage area is essentially the area of one lens.

SUMMARY

In one implementation, the present disclosure is directed to an eyewear system. The eyewear system comprises a first lens and second lens; each lens comprising a lens area, a width, an outer edge, a lens thickness, an active area and a lens plane. The eyewear system further comprises a collapsible nose bridge connecting the two lenses; two contracting temple members, each contracting temple member operable to contract to a contracted length less than or equal to the width of each lens; a temple hinge connecting each contracting temple member at or interior to the outer edge of each lens above the active area of each lens; and where each temple member pivots around the temple hinge to fold into the lens plane with the contracted length no more than the width of each lens. The temple members further have a folded size no more than the lens width plus any surrounding portion of the frame holding the lens and no thicker than the thickness of a single lens. The nose bridge collapses across a lens plane and has a thickness no more than twice the thickness of a single lens.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
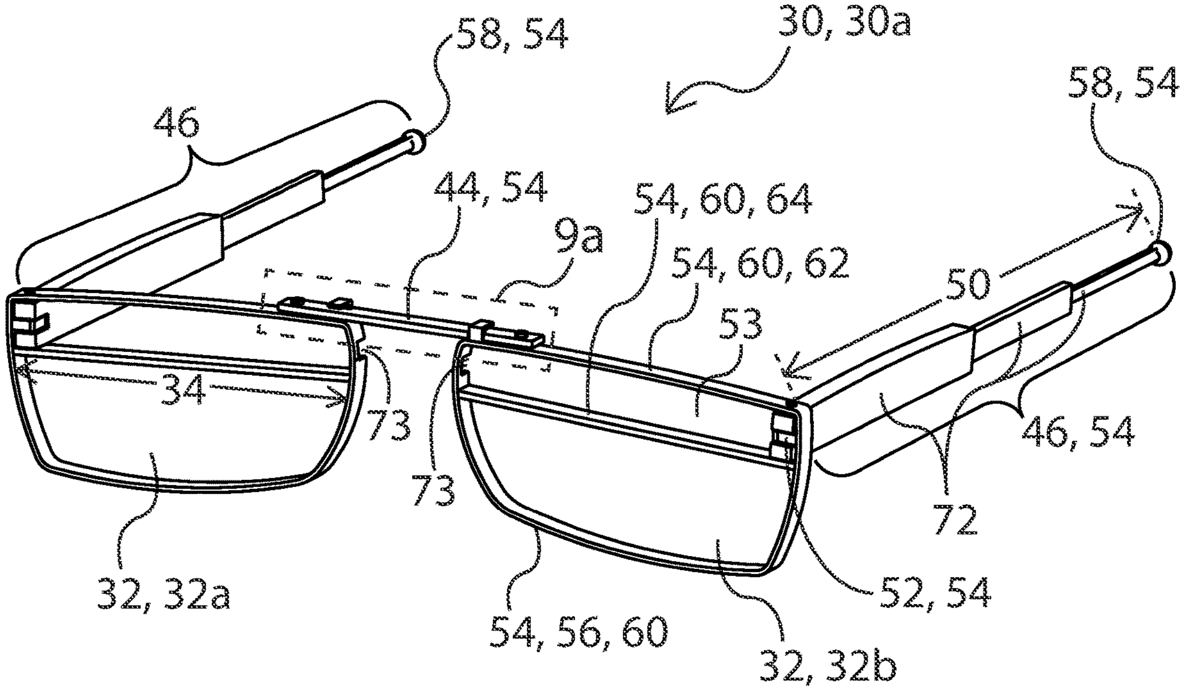
FIG. 1*a* is a front perspective view of one embodiment of the eyewear system in accordance with the present invention in an open state.

Eyewear system 30 (30*a*-30*f*) is illustrated in FIGS. 1*a*-22. Eyewear system 30 (a.k.a. glasses) is a contractible and expandable eyewear system that allows for very compact storage of the eyewear. Eyewear system 30 comprises two lenses 32 (first lens 32*a* and second lens 32*b*). Each lens has a front surface 31, a back surface 33, a lens width 34, an outer edge 36, a lens thickness 38, an active area 40 and a lens plane 42. Lens thickness 38 may be the thickness of a flat lens or the curved thickness of a curved lens. Eyewear system 30 further comprises collapsible nose bridge 44 connecting the two lenses 32. Eyewear system 30 also comprises two contracting temple members 46. Each contracting temple member 46 is operable to contract to a contracted length 48 that is less than or equal to width 34 of each lens. From the contracted state, contracting temple members 46 may expand to an expanded length 50. Eyewear system 30 further comprises temple hinge 52 connecting each contracting temple member 46 at or interior to outer edge 36 of each lens 32 above active area 40 of each lens. Each contracting temple member 46 pivots around temple hinge 52 to fold into lens plane 42 to fit within a temple gap 53 above the active area 40 of lens 32 with contracted length 48 no more than lens width 34 of each lens. Lens plane 42 is a plane passing through each lens bisecting the thickness of the lens or the curvature of the lens. Eyewear system 30 folds to a fully folded width of no more than the width of a single lens plus any frame surrounding the lens if present and a fully folded thickness no more than twice the thickness of a single lens or frame surrounding the lens, whichever is greater. Ideally the frame if present will be designed to be equal to or less than the thickness of the lens. When eyewear system 30 is collapsed, the lenses stack next to each other nesting with the same curvature to provide a minimal gap between the lenses.

The eyewear system 30 is primarily planned for use as reading glasses since such glasses do not need to be worn at all times; however, the eyewear system could be used for any type of corrective lenses or simply as non-correcting lenses to be worn for fashion or as sunglasses. Lenses 32 may be any standard lens is used in eyewear today. These lenses can be fabricated from glasses, plastic, a composite, etc. To have the thinnest eyewear system, high index of refraction materials would be best for corrective lenses. For sunglasses or fashion, thin lenses would also best be best to provide for the thinnest collapsed thickness of the lens system.

In general there is a frame 54 integrated with the lenses. Frame 54 supports the lenses, keeps the lenses attached together, and supports the lenses on the head when worn. Parts of the frame may include lens frame 56, collapsible folding nose bridge 44, contracting temple members 46, temple hinge 52, and temple knob 58. Lens frame 56 may include surrounding member 60, top member 62, and cross bar 64. In some embodiments various portions of the frame may not be included, such as cross bar 64 missing in FIGS. 20-22, and surrounding member 60, top member 62 and cross bar 64 in FIG. 22. Frame 54 may further include rubber bumpers on the portion of the frame resting on the nose.

Figure 1B:
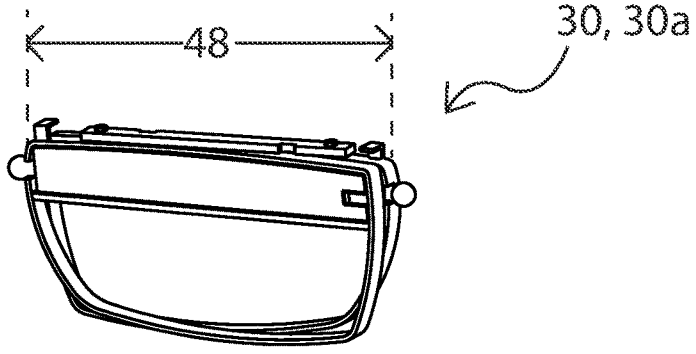
FIG. 1*b* is a front perspective view of the eyewear system in FIG. 1*a* in a fully collapsed state.
Figure 2:
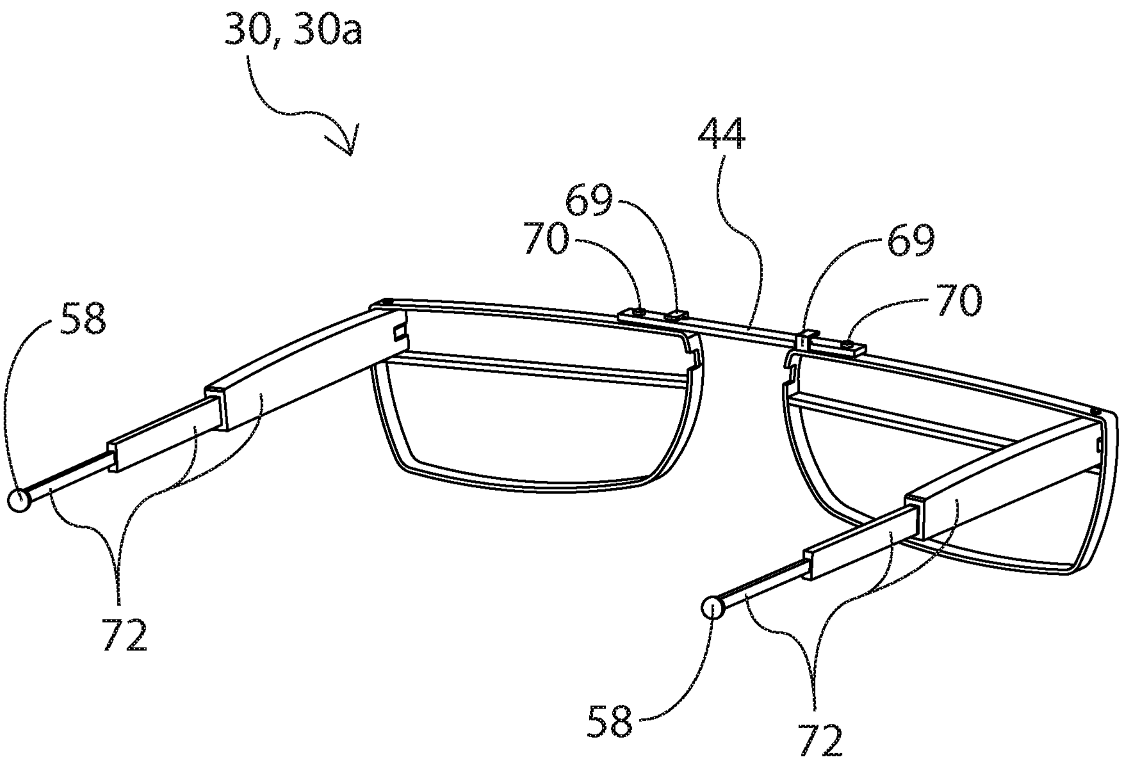
FIG. 2 is a back perspective view of the eyewear system in FIG. 1*a;*
Figure 3:
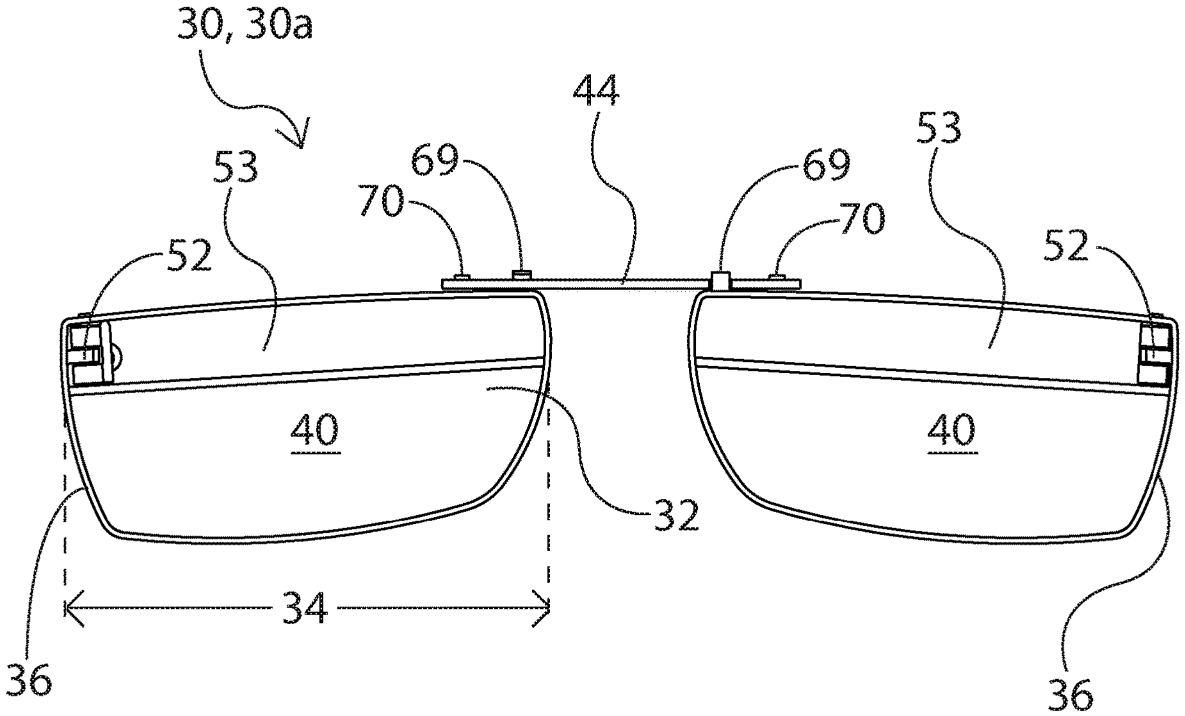
FIG. 3 is a front view of the eyewear system in FIG. 1*a;*
Figure 4:
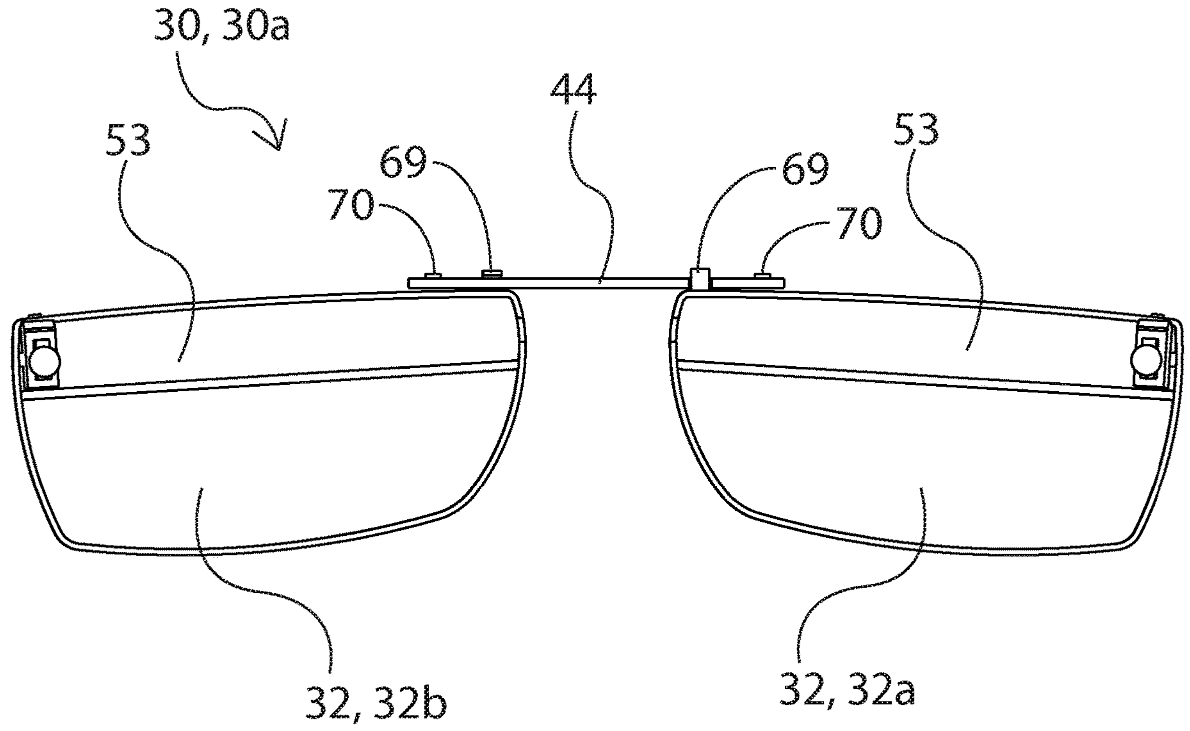
FIG. 4 is back view of the eyewear system in FIG. 1*a;*
Figure 5:
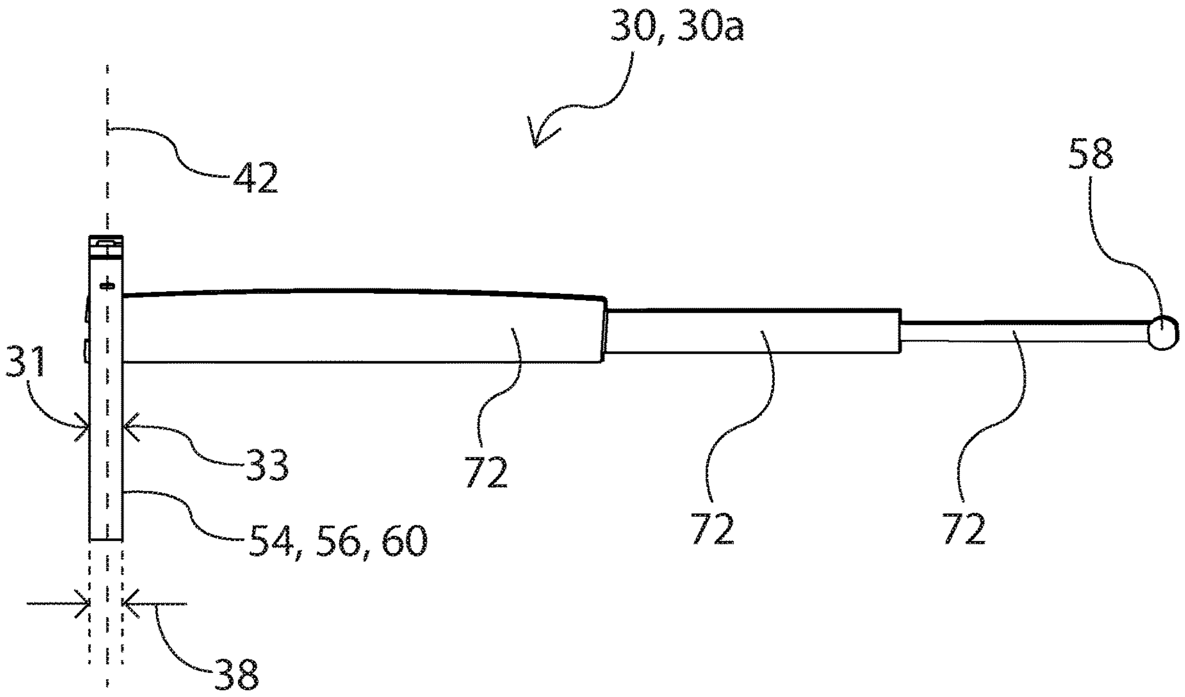
FIG. 5 is right side view of the eyewear system in FIG. 1*a;*
Figure 6:
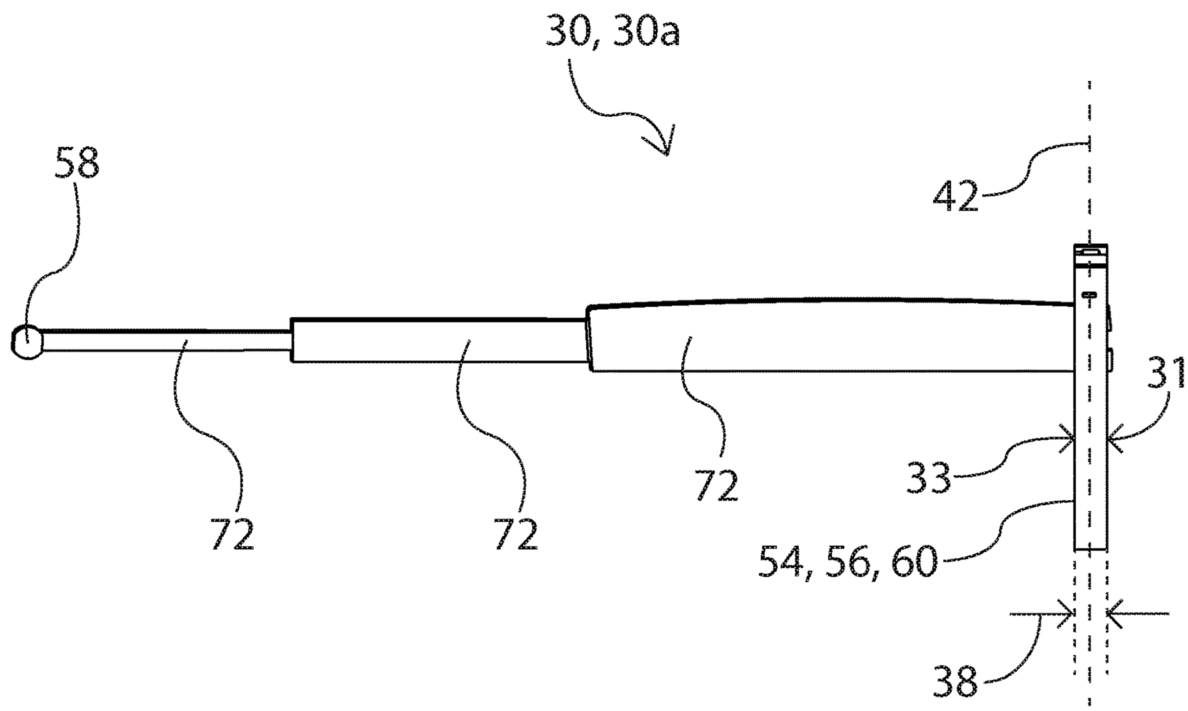
FIG. 6 is left side view of the eyewear system in FIG. 1*a;*
Figure 7:
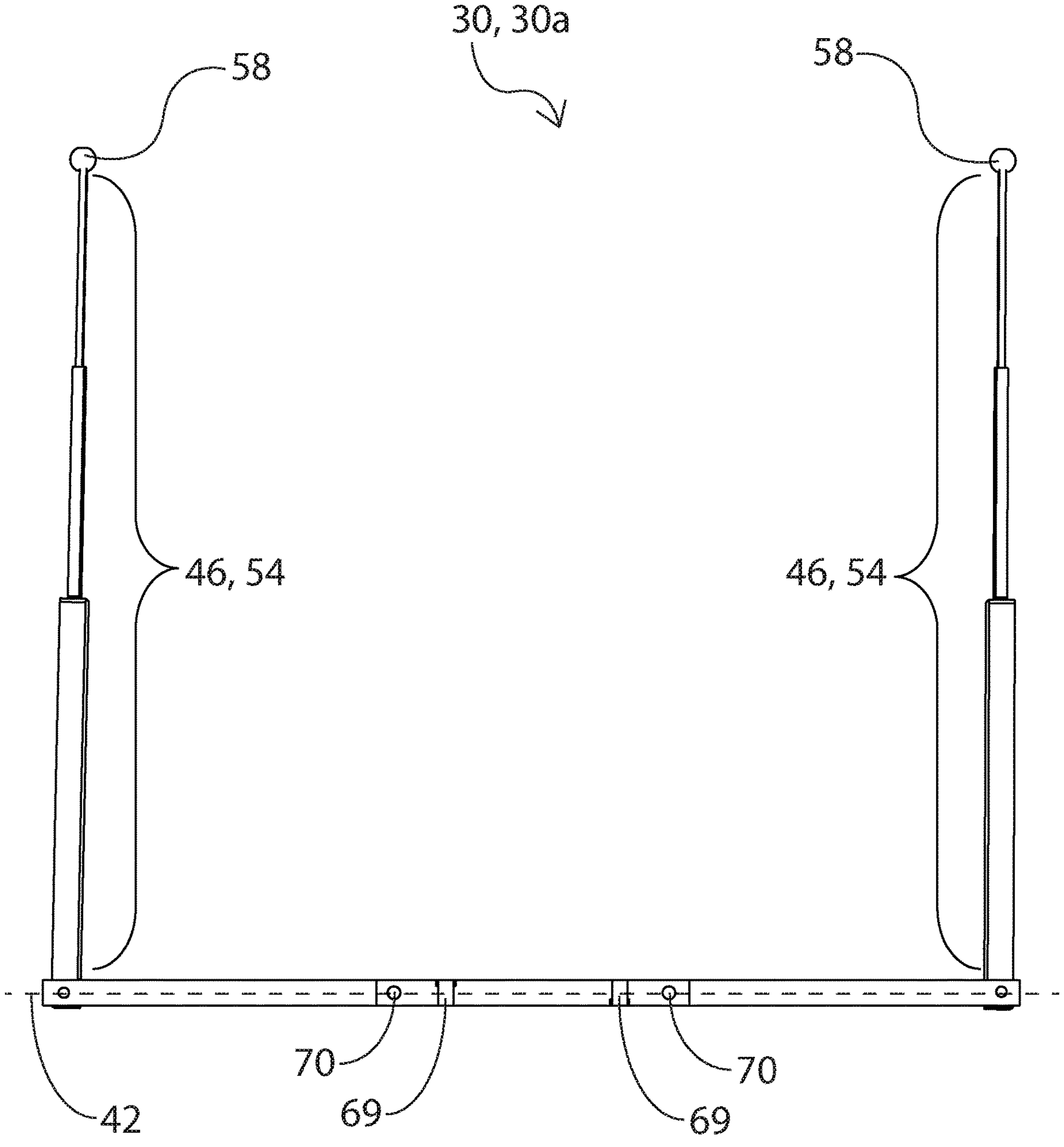
FIG. 7 is top view of the eyewear system in FIG. 1*a;*
Figure 8:
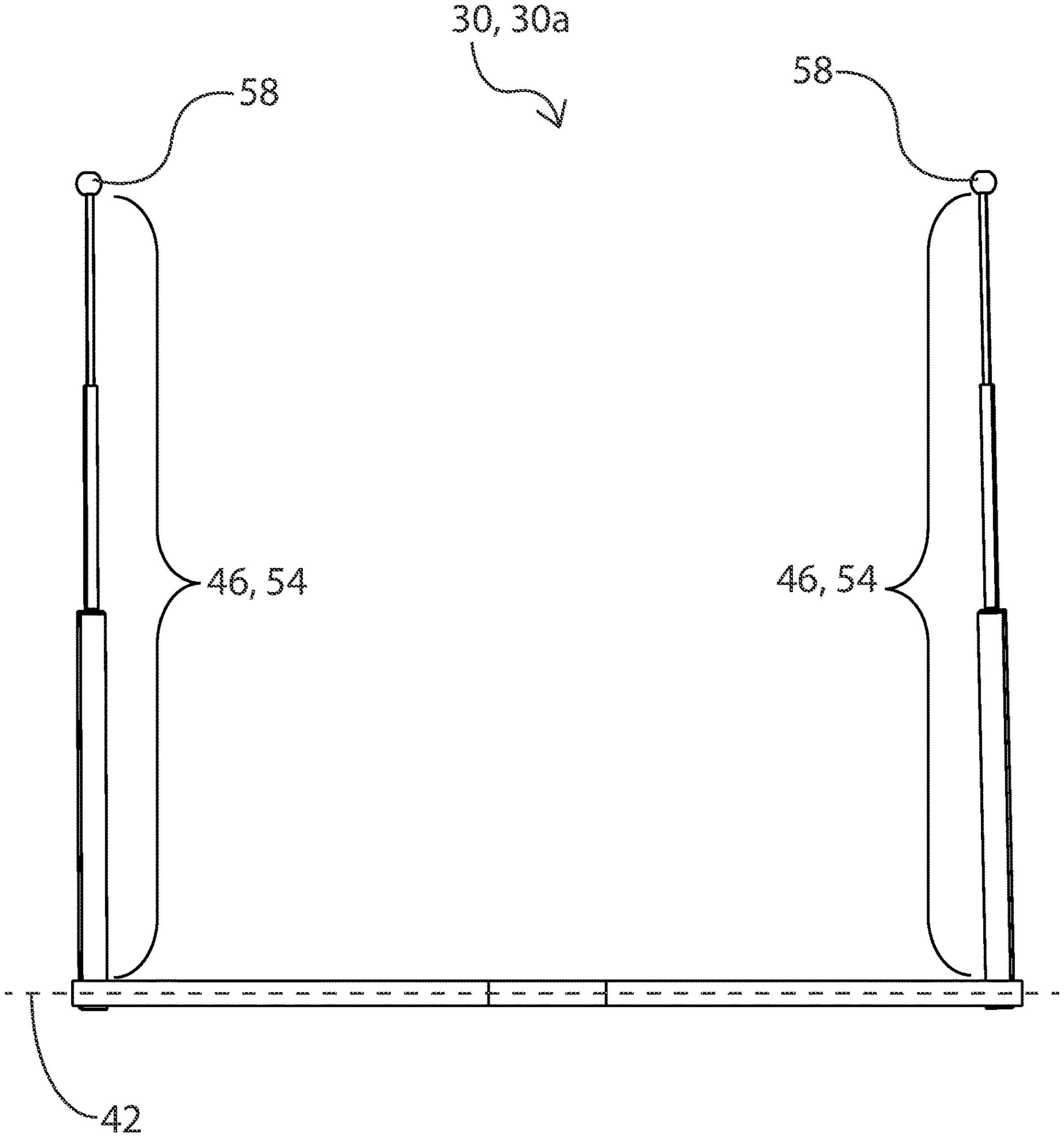
FIG. 8 is bottom view of the eyewear system in FIG. 1*a;*
Figure 9A:
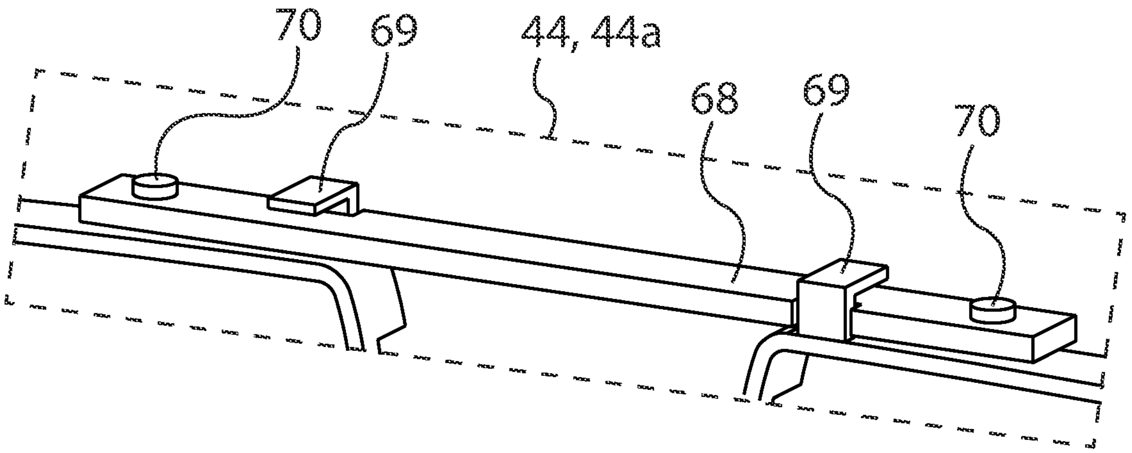
FIG. 9*a* is an enlarged view of the region 9*a* of the eyewear system in FIG. 1*a;*
Figure 9B:
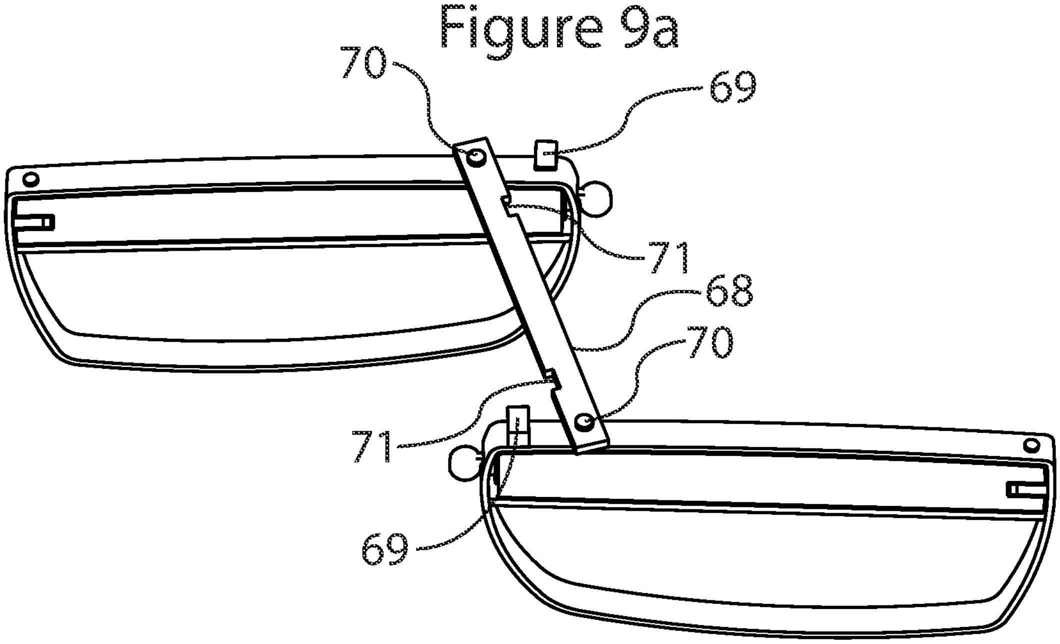
FIG. 9*b* is a perspective view of one position of the z-fold nose bridge shown in FIG. 9*a;*
Figure 9C:
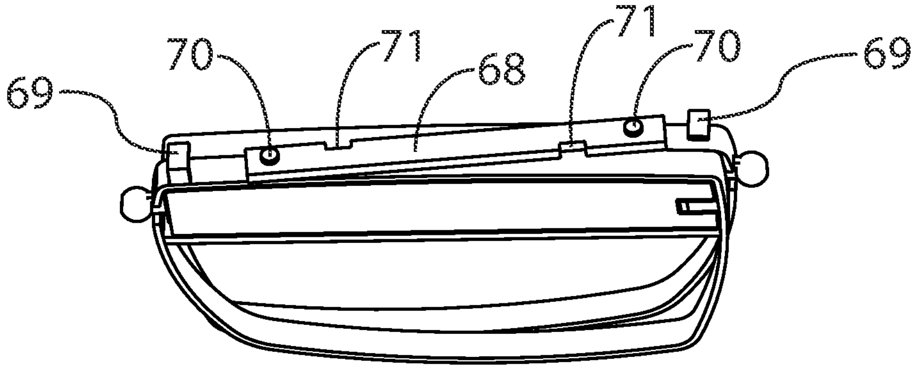
FIG. 9*c* is a perspective view of another position of the z-fold nose bridge shown in FIG. 1*a;*
Figure 10:
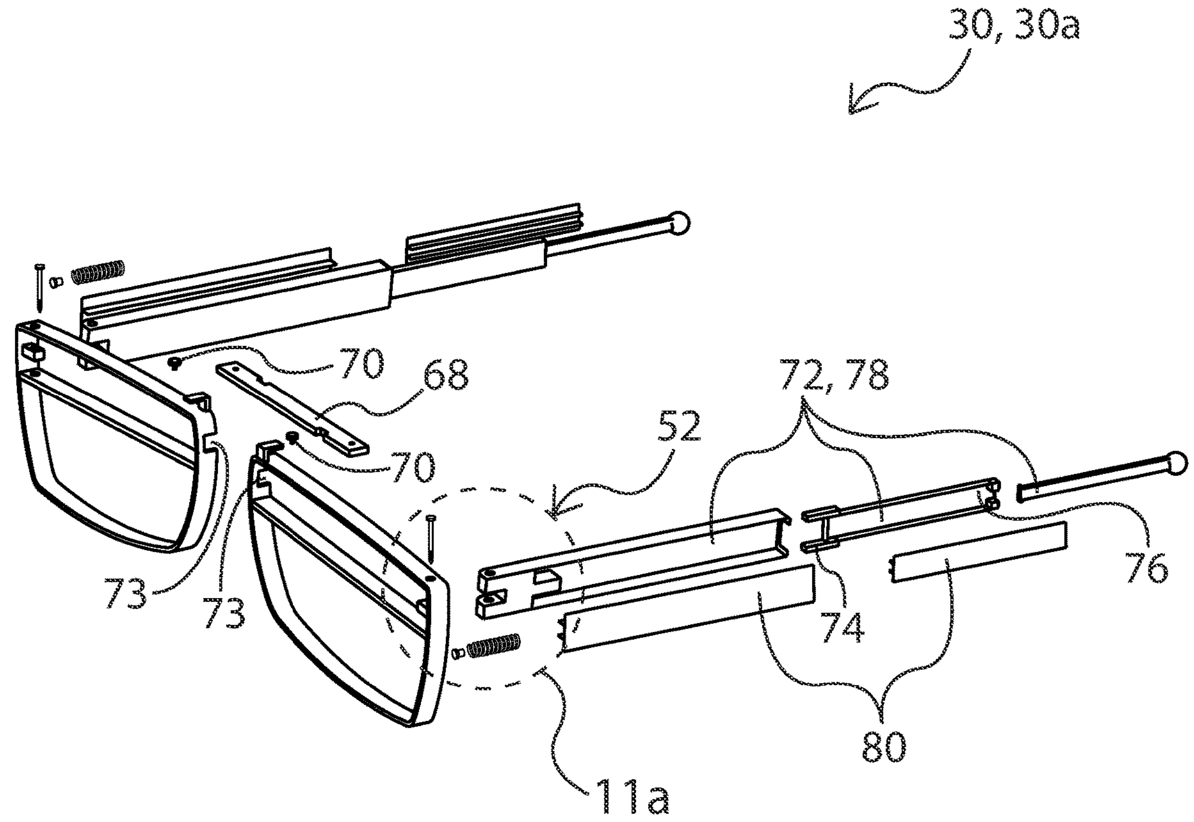
FIG. 10 is an exploded view of the eyewear system in FIG. 1*a;*
Figure 11A:
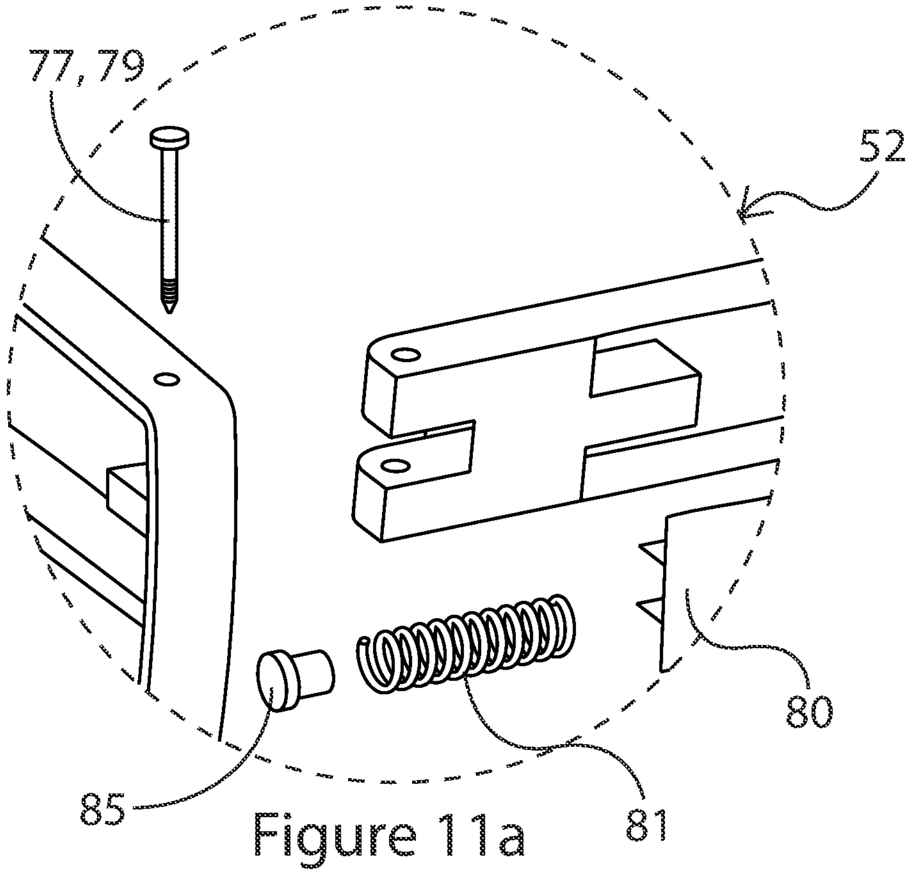
FIG. 11*a* is an enlarged view of the region 11*a* in FIG. 10, the enlarged view showing the components of the temple hinge.
Figure 11B:
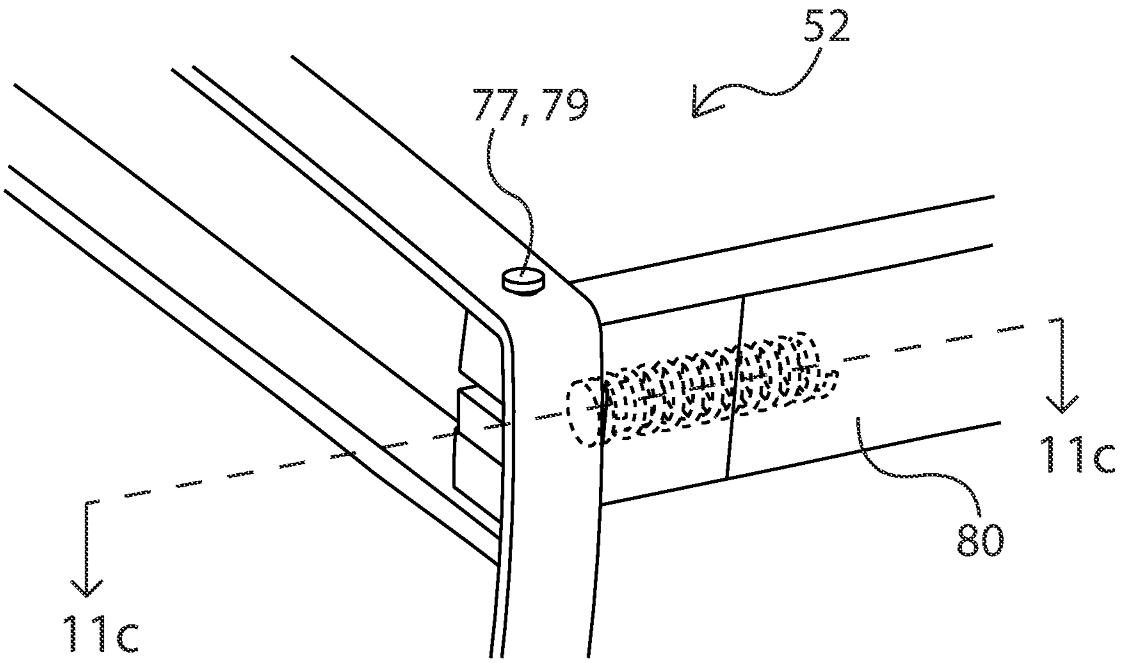
FIG. 11*b* is a partially transparent assembled view of the eyewear components shown in FIG. 11*a;*
Figure 11C:
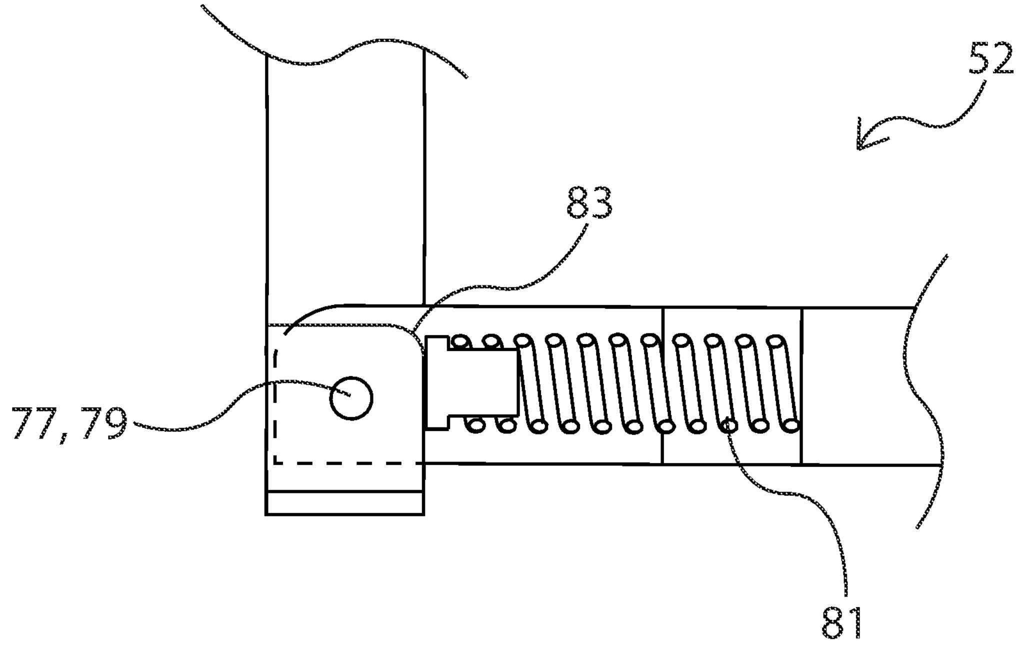
FIG. 11*c* is a top down, sectional view along 11c-11*c* of FIG. 11*b;*
Figure 11D:
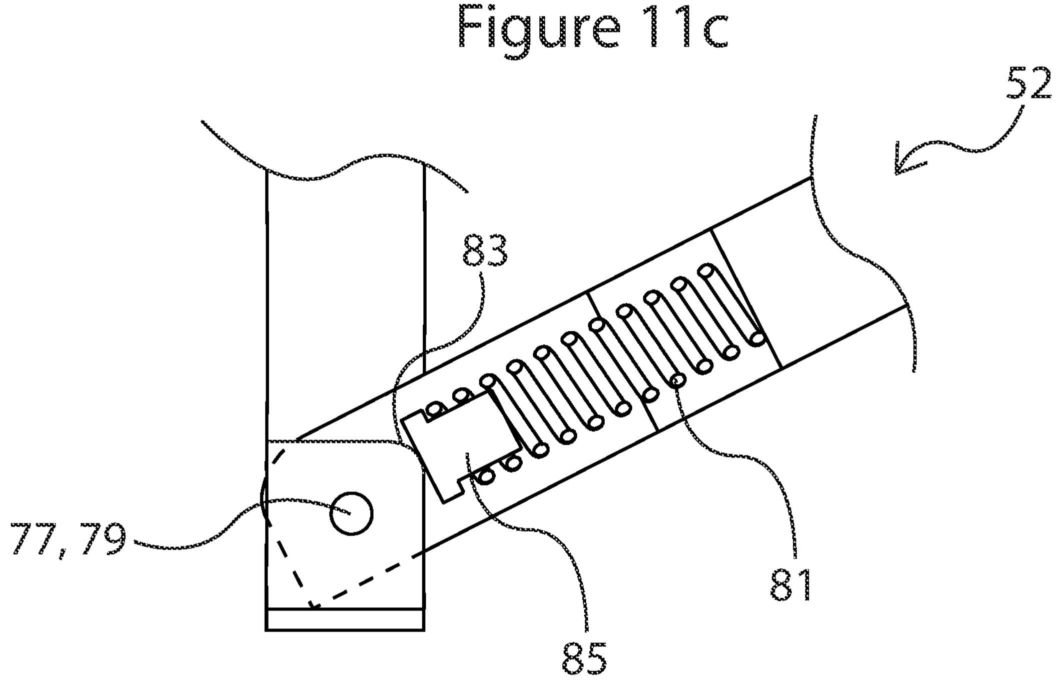
FIG. 11*d* is a partially collapsed state of the contracting temple member and frame in FIG. 11*c* showing operation of the temple hinge.
Figure 12A:
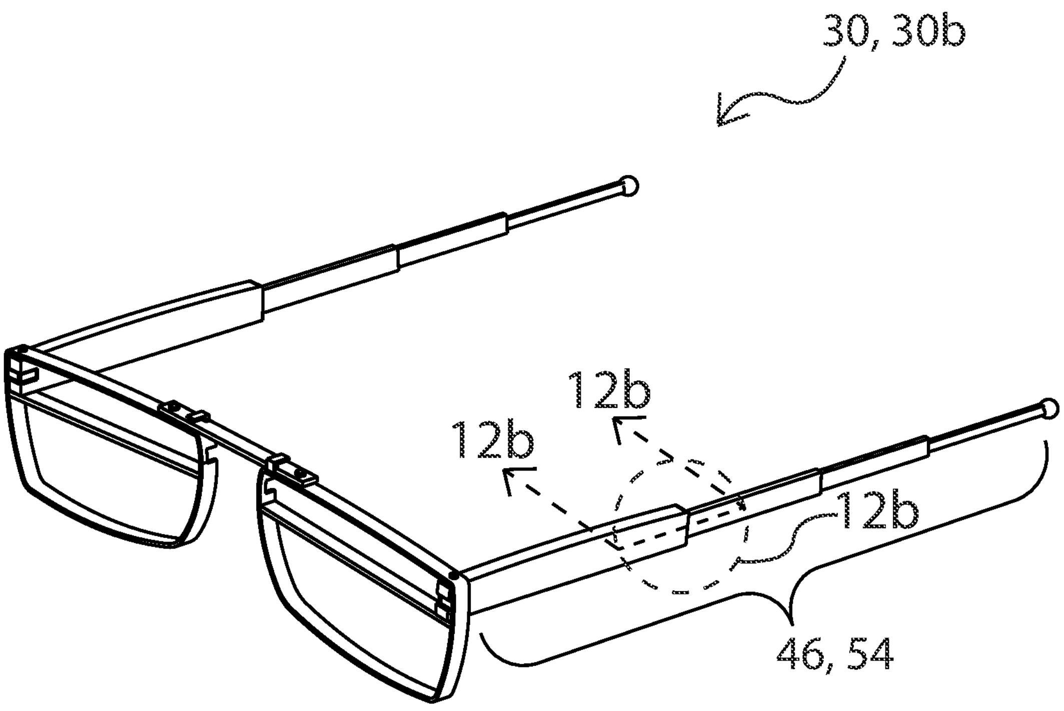
FIG. 12*a* is a front perspective view of an embodiment of the eyewear system in FIG. 1*a*, now with four telescoping members for the temple members.
Figure 12B:
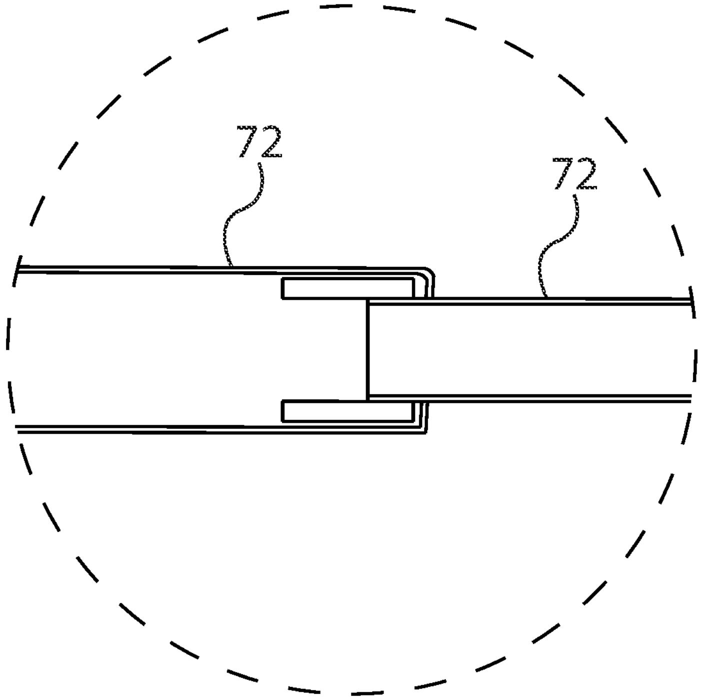
FIG. 12*b* is a sectional view along 12b-12b of the region 12*b* in FIG. 12*a* showing the hollow structure of the temple members.
Figure 13A:
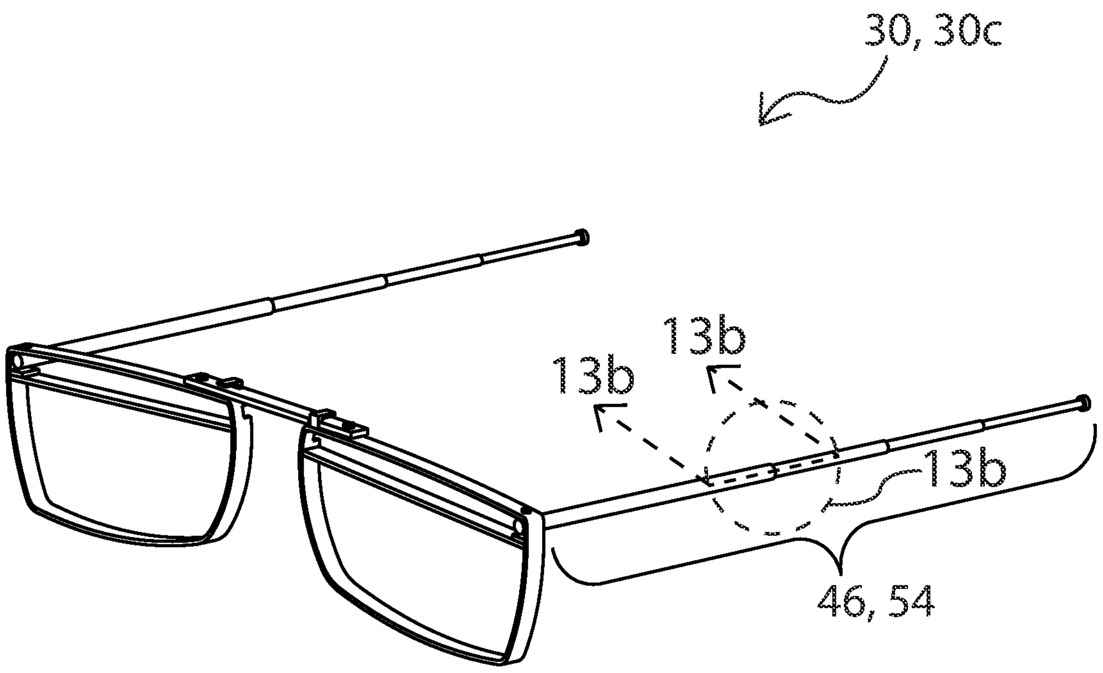
FIG. 13*a* is a front perspective view of an embodiment of the eyewear system in FIG. 12*a*, now with tubular telescoping members.
Figure 13B:
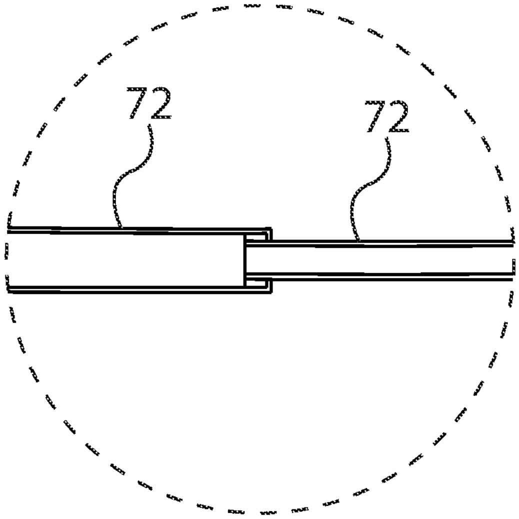
FIG. 13*b* is a sectional view along 13b-13b of the region 13*b* in FIG. 13*a* showing the hollow structure of the temple members.

The collapsible nose bridge 44 connects both lenses 32 together and allows them to be folded to lie parallel and adjacent to each other, FIGS. 1*b* and 9*c*. Collapsible nose bridge may collapse by folding pivoting, or sliding of associated components. In one embodiment, FIGS. 9*a-c*, folding nose bridge is a z-fold nose bridge 44*a*. Z-fold nose bridge 44*a* includes a z-strip 68 that connects between to lenses 32. Z-strip 68 is connected by two z-pins 70, where the z-pins fit either into top member 62 or directly into lens 32. Z-fold nose bridge 44*a* may have two z-fold stops 69 that mate with two z-fold gaps 71 to hold the z-fold nose bride 44*a* secured in place when lens 32 are fully expanded into the same lens plane. Z-strip 68 pivots relative to both z-pins 70. Temple knob slot stop 73 is provided to accept temple knob 58 and stop contracted and pivoted contracted temple members from folding beyond lens plane 42. Z-fold nose bridge allows lens that may have curvature to be stacked on top of each other so the same curvatures nest to provide the minimum space between the lenses.

Contracting temple members 46 use a telescoping structure to provide for temple members that can exist in a shortened contracted state or in a longer expanded state for holding the eyewear over the ears. The telescoping structure includes elongated temple segments 72 have different diameters. The smaller diameter temple segments slide within the larger temple segments, FIGS. 10, 12*b* and 13*b*. On the end of each temple segment is a securing flange 74 has a slightly larger diameter than the outer diameter that segment, but where the securing flange diameter can still slide with the hollow core 76 of the next largest temple segment. Temple segments 72 may have a square, rectangular, round or oval cross section. Temple segments 72 may be composed of multiple segments such as 78 and 80 in FIG. 10. In general four temple segments 72; such as in eyewear system 30*b* (FIG. 12*a*), 30*c* (FIG. 13*a*) and 30*d* (FIG. 20); are probably the most accommodating, but any number of segments may be used as long as that in the expanded state temple members 46 can fit over the ears and in the contracted state the temple members can fit within temple gap 53 above the active area of lenses 32. The smallest diameter temple segment 72 may be solid or hollow. Temple knobs 58 maybe attached to the non-flanged end of the smallest segment. Temple knobs 58 are critical to act as a structure to both pull the temple members to an expanded state and to pull/hold the collapsed eyewear system 30 from holding case 82. In other embodiments telescoping temple members may be replaced by accordion temple members or hinged folding temple members that fold back and forth upon themselves.

The structure of temple hinge 52 is shown in FIGS. 11*a-d*. Temple hinge 52 lies within the lens plane. Temple hinge is a spring hinge. Temple hinge 52 has a hinge pivot 77. Hinge pivot 77 may be partially threaded screw 79, which holds the collapsing temple member to the outer lens frame. Temple hinge 52 includes spring 81 an detent 83. Temple hinge 52 also includes spring compressing element 85. Spring compressing element 85 moves against detent 83 allowing temple member to rotate. Temple hinge 52 likes to reside in the open state for expanded temple members to go over ones ears or the temple hinge likes to be in the closed position with collapsed temple members in the temple gap. Generally the temple hinge has 90 degrees of flex, but can flex slightly more if a force is applied. When the force is removed the temple hinge likes to return to the open or closed positions.

Figure 14A:
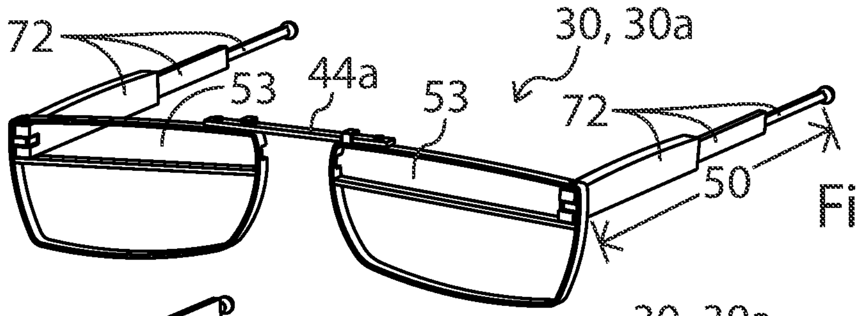
FIG. 14*a* is a first, fully expanded state of the eyewear system of FIG. 1*a;*
Figure 14B:
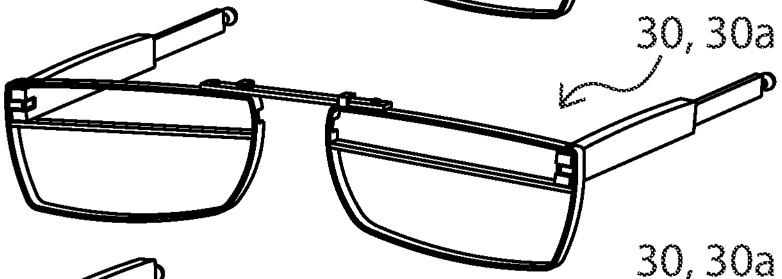
FIG. 14*b* is a second, partially contracted state of the eyewear system of FIG. 1*a;*
Figure 14C:
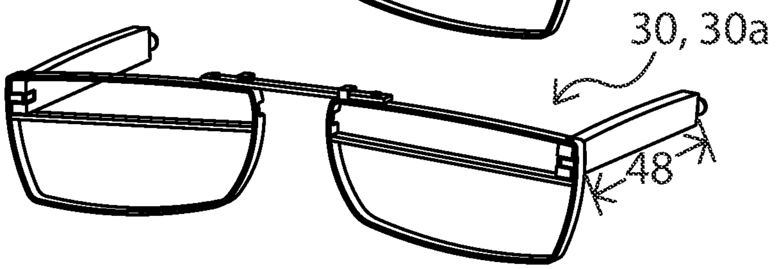
FIG. 14*c* is a third, partially contracted state of the eyewear system of FIG. 1*a;*
Figure 14D:
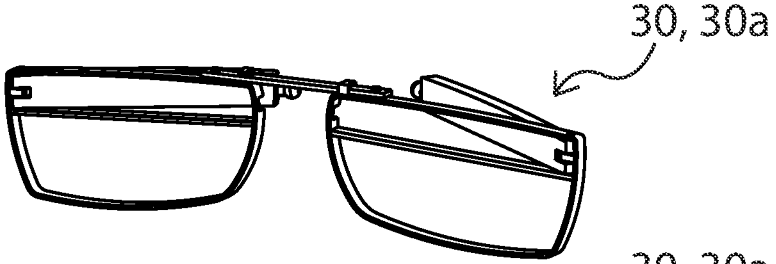
FIG. 14*d* is a fourth, partially contracted state of the eyewear system of FIG. 1*a;*
Figure 14E:
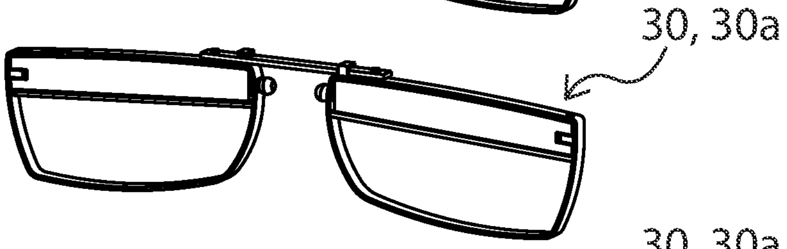
FIG. 14*e* is a fifth, partially contracted state of the eyewear system of FIG. 1*a;*
Figure 14F:
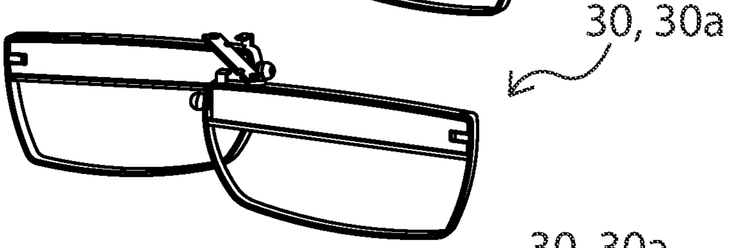
FIG. 14*f* is a sixth, partially contracted state of the eyewear system of FIG. 1*a;*
Figure 14G:
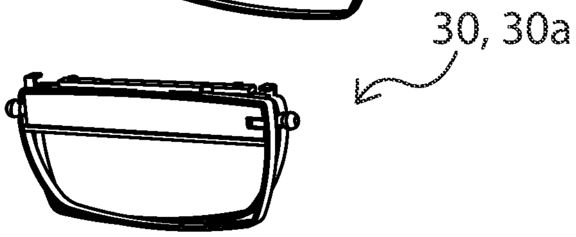
FIG. 14*g* is a seventh, fully contracted state of the eyewear system of FIG. 1*a;*

Operational use of eyewear system 30 is shown in FIGS. 14*a*-14*g*. In FIG. 14*a*, the glasses are in fully expanded and ready for wearing. In FIG. 14*b*, the smallest, end temple segment 72 has been pushed into the temple segment next to it. In FIG. 14*c*, all temple segments 72 have been contracted. In FIG. 14*d*, the contracted temple segments 72 are now rotated around temple hinge 52 and folded inward towards lens plane 42. In FIG. 14*e*, contracted temple segments 72 have been folded into temple gap 53. In FIG. 14*f*, *z*-fold nose bridge 44*a* is disengage and first lens 32*a* and second lens 32*b* are starting to fold parallel to each other. In FIG. 14*g*, eyewear system 30 is now fully collapsed with first lens 32*a* on top of second lens 32*b*. The collapsed eyewear system 30 is now ready for storage into holding case 82. When expanding eyewear system 30, the reverse order of steps, FIG. 14*g* to FIG. 14*a*, are taken.

Figure 15:
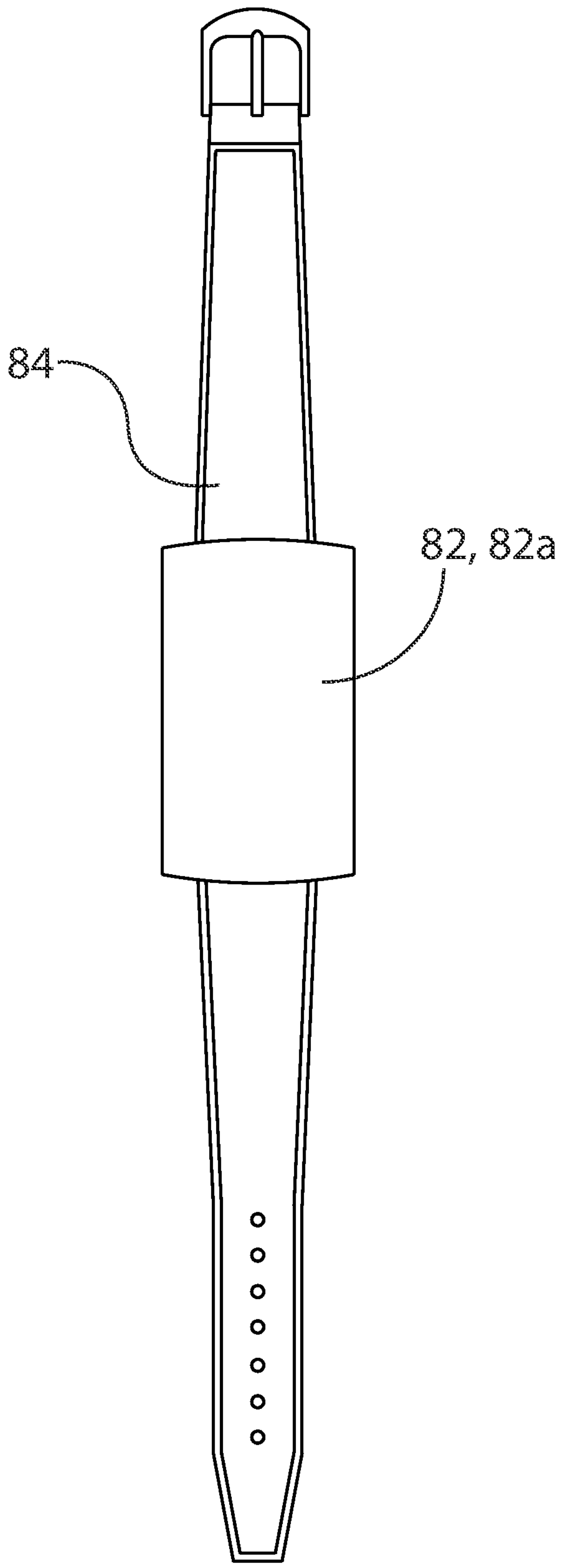
FIG. 15 is a top view of a wrist band for storing the eyewear system of FIG. 1*a;*
Figure 16A:
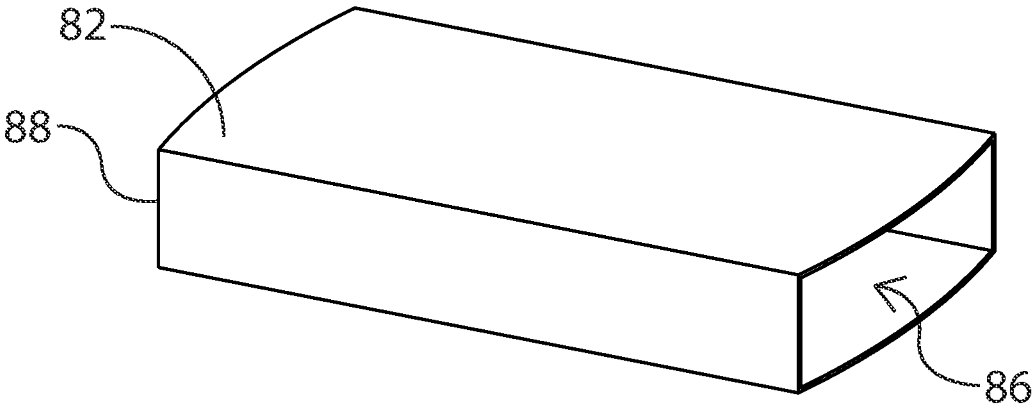
FIG. 16*a* is right side, perspective view of the holding case shown in FIG. 15.
Figure 16B:
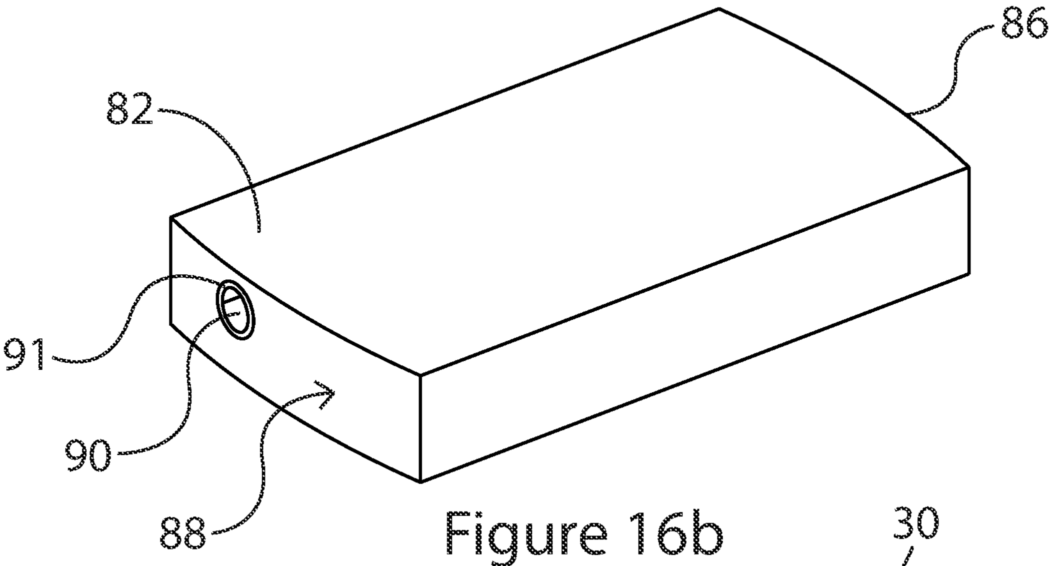
FIG. 16*b* is left side, perspective view of the holding case in FIG. 16*a;*
Figure 16C:
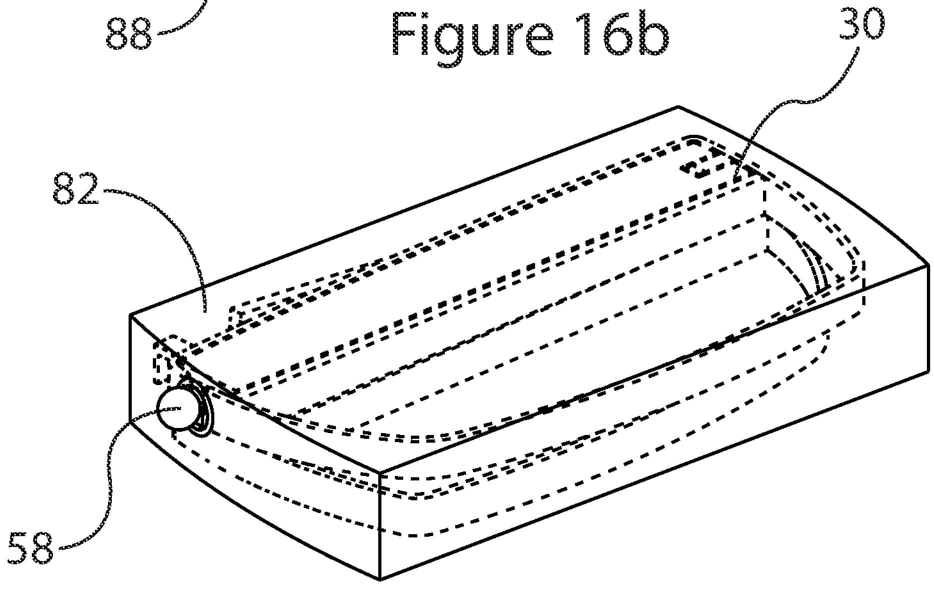
FIG. 16*c* is the left side perspective transparent view of the holding case of FIG. 16*a* showing how the eyewear of FIG. 1*b* is slipped into the holding case attached to the wrist band.
Figure 17:
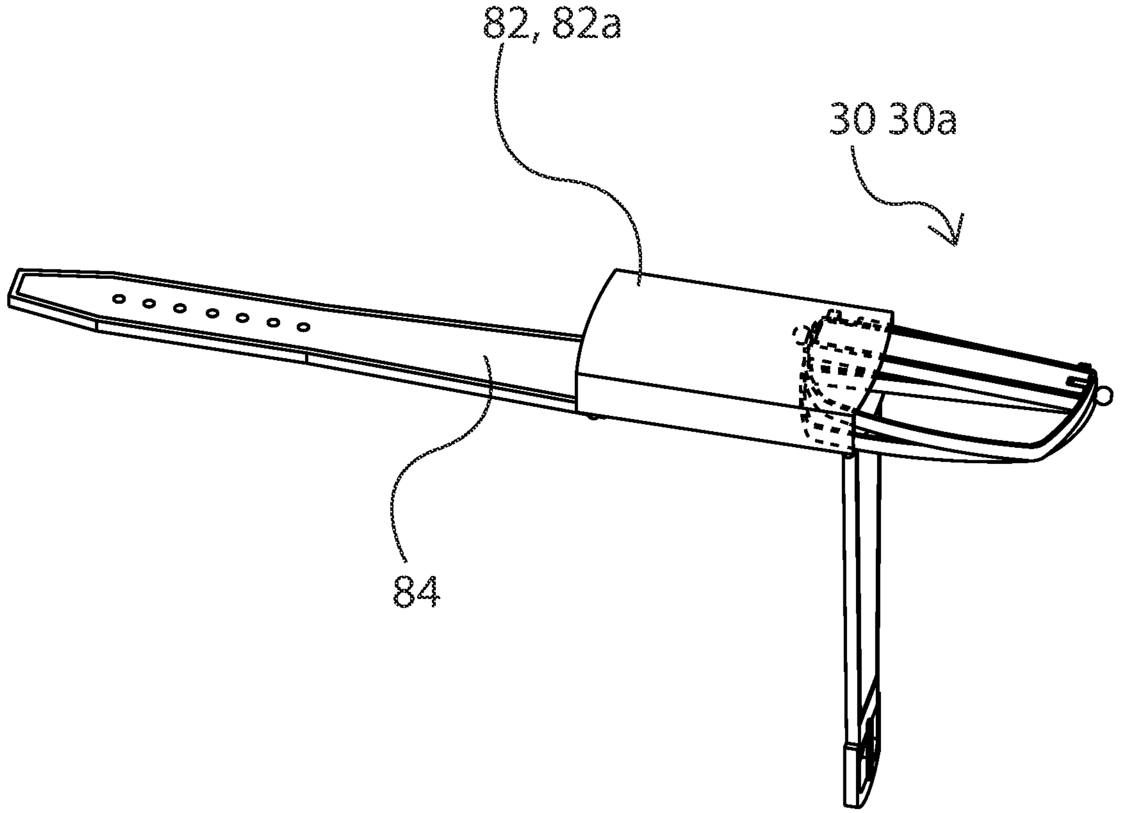
FIG. 17 is perspective partially transparent view of the wrist band of FIG. 15 for storing the eyewear system of FIG. 1*b*, now with the collapsed eyewear system partially inserted into the holding case.
Figure 18:
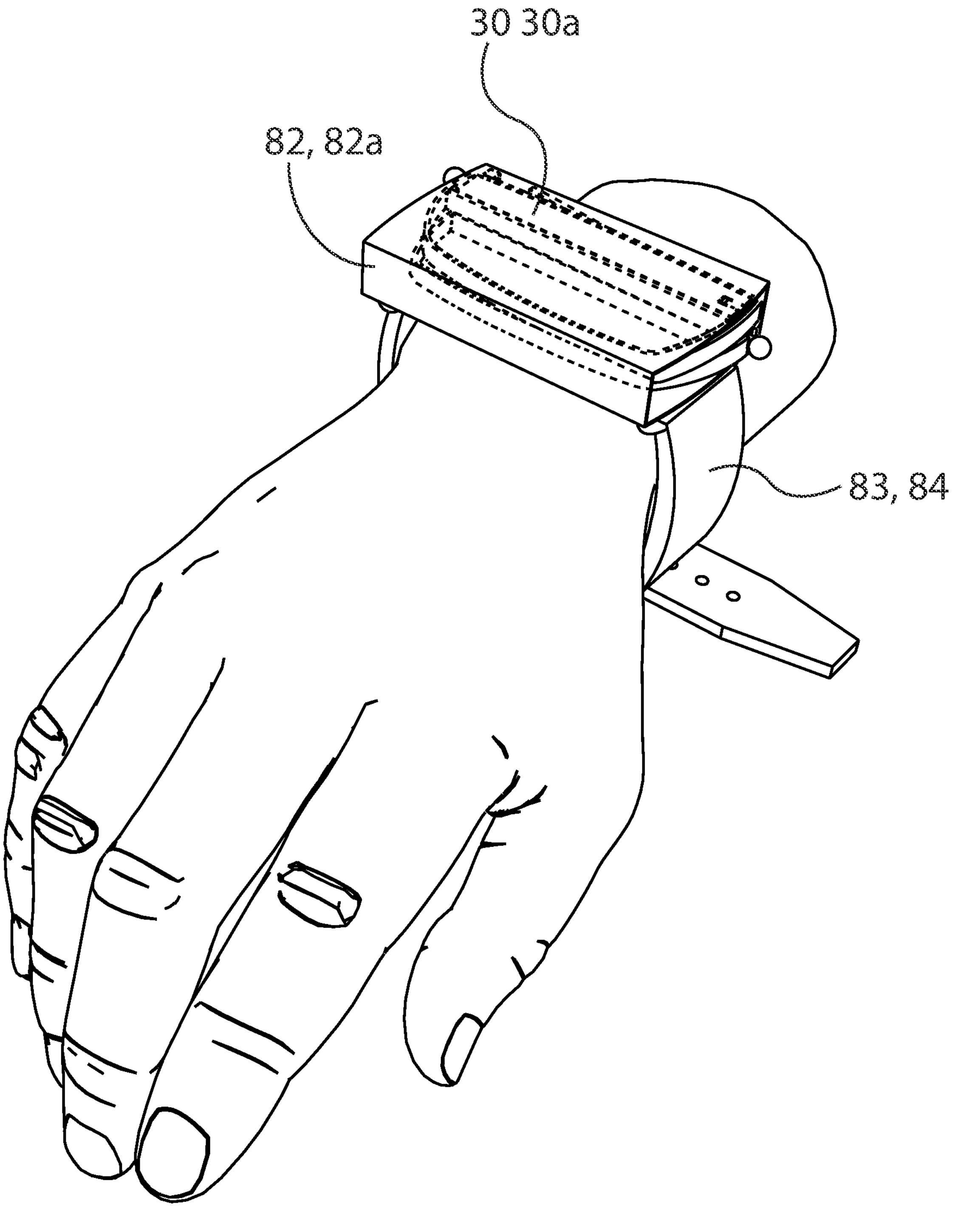
FIG. 18 is a side perspective transparent view of the wrist band of FIG. 15 showing the band now attached to a person's hand.
Figure 19:
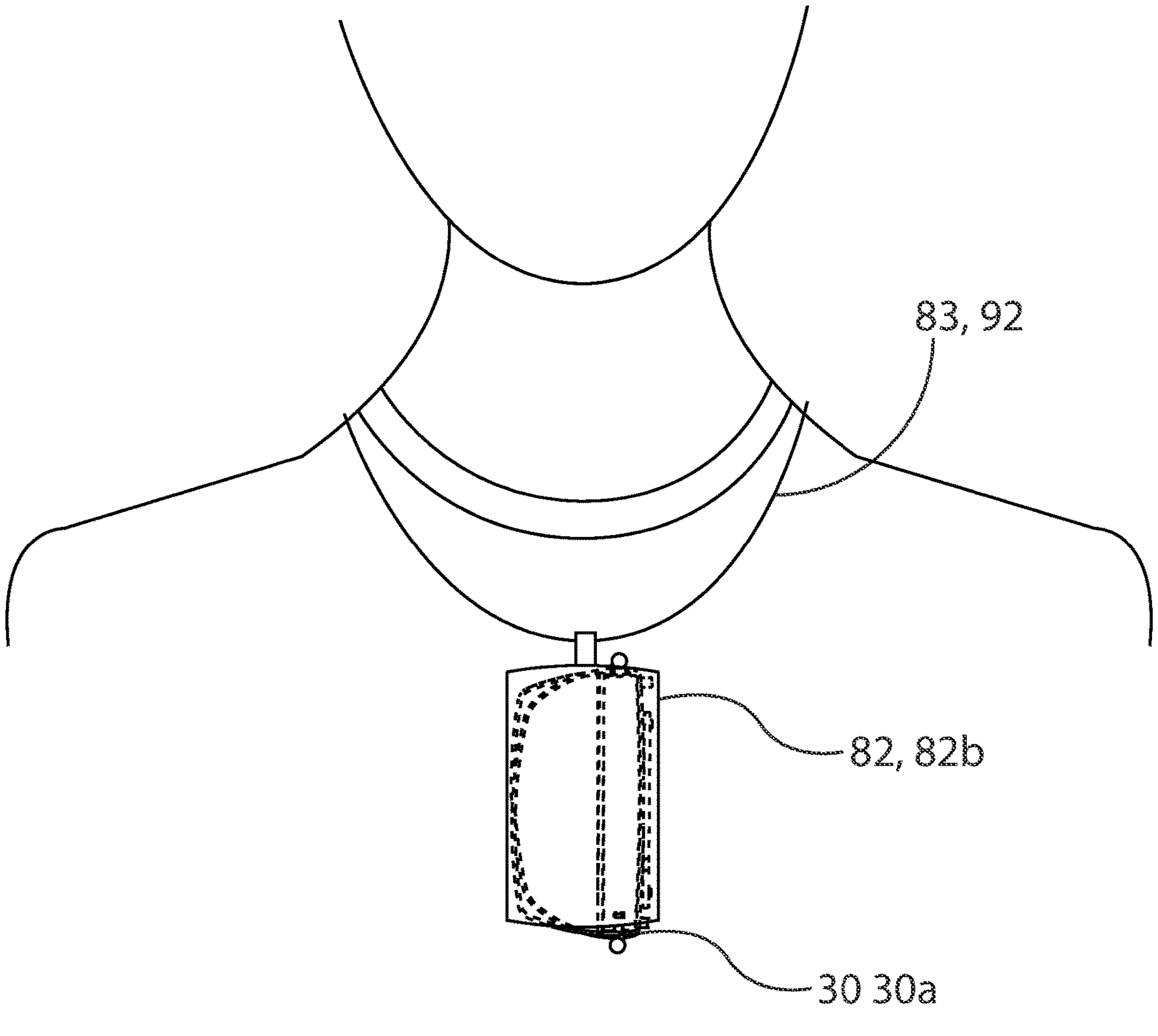
FIG. 19 is a front transparent view of a necklace for storing the eyewear system of FIG. 1*a;*

Two exemplary embodiments of holding case 82 are shown in FIGS. 15-18 (wrist case 82*a*) and FIG. 19 (necklace case 82*b*). Holding case 82 is slightly larger than the dimensions of collapsed eyewear system 30. In FIGS. 15, 17 and 18 case 82*a* is mounted on a wristband 84. Collapsed eyewear system 30 is slid into edge opening 86. The side opposite edge opening 86 is a sealed edge 88 with a temple knob opening 90 through which temple knob 58 may fit into when the collapsed eyewear system is fully inserted into holding case 82. When fully inserted, FIG. 16*c*, temple knob 58 protrudes from temple knob opening 90. Temple knob opening 90 may have a grommet 91 to provide resistance to hold the collapse eyewear within the case. This arrangement allows the user to easily push temple knob 58 to start the removal of collapsed eyewear system 30 from holding case 82. Wristband 84, with collapsed eyewear system 30, may be worn similar to a watch as shown in FIG. 18. A digital or mechanical time piece may also be incorporated into the outer surface of holding case 82 so the case can have the dual purpose of a watch. In another embodiment, FIG. 19, holding case 82, 82*b* may be worn as a necklace 92. The outer portion of holding case 82 may be adorned with jewels or other designs to also act as a piece of jewelry. In other embodiments, holding case 82 may be incorporated as part of a bracelet, bangle or cuff. Holding case 82 may be attached to a body attachment element 83 via the back or edge of the holding case. Attachment mechanisms may include pins, bars, loops, adhesive, slots, links, etc.

Figure 20:
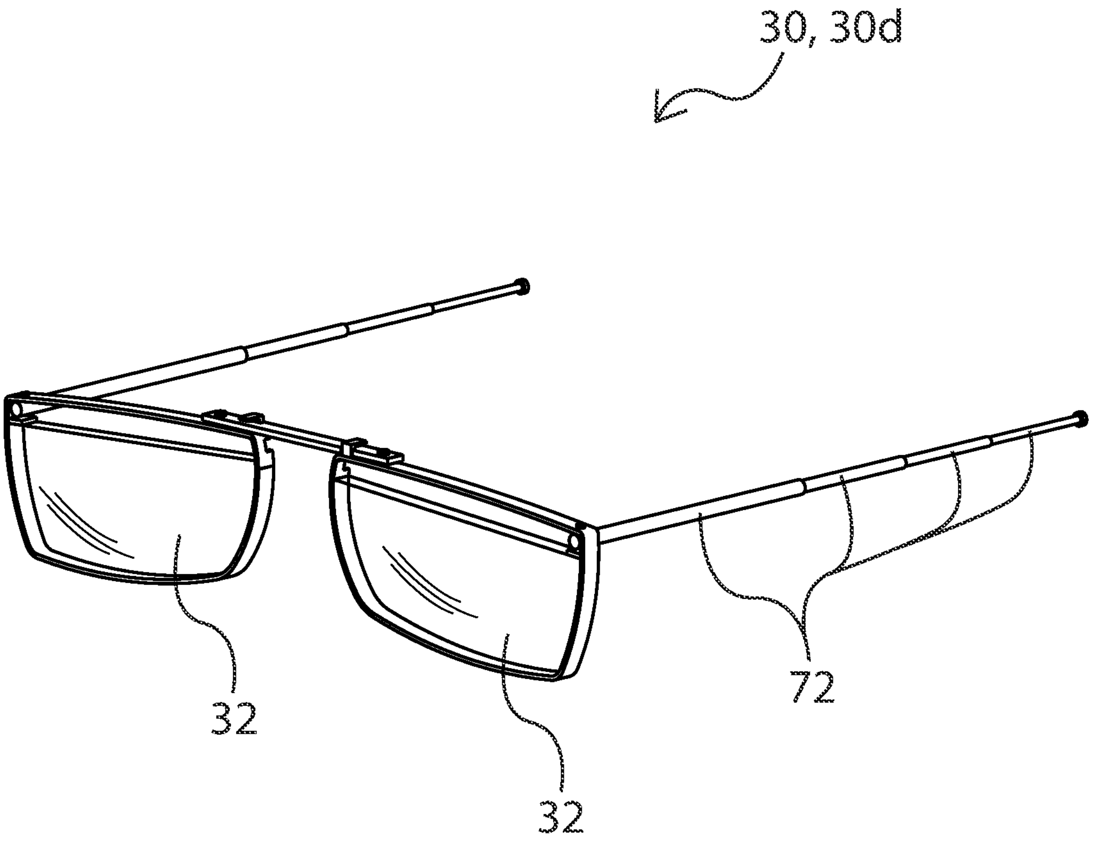
FIG. 20 is a perspective view of an embodiment of the eyewear system in FIG. 13*a*, now with no cross bar.
Figure 21A:
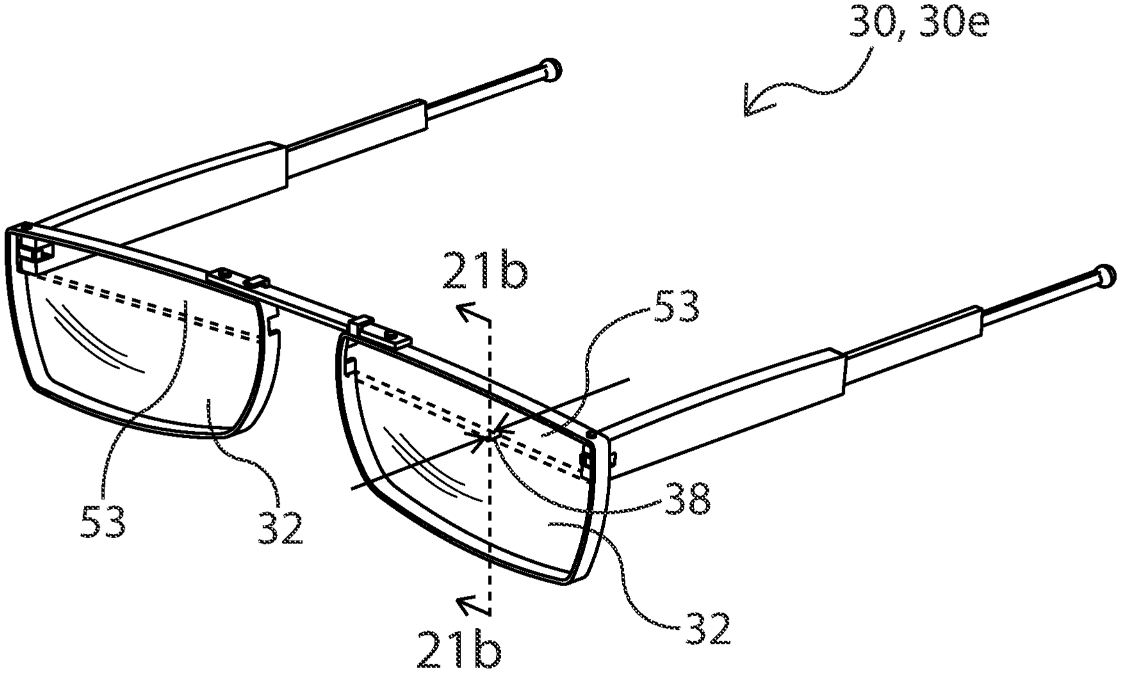
FIG. 21*a* is a perspective view of an embodiment of the eyewear system in FIG. 1*a*, now with a recess in the lens and no cross bar.
Figure 21B:
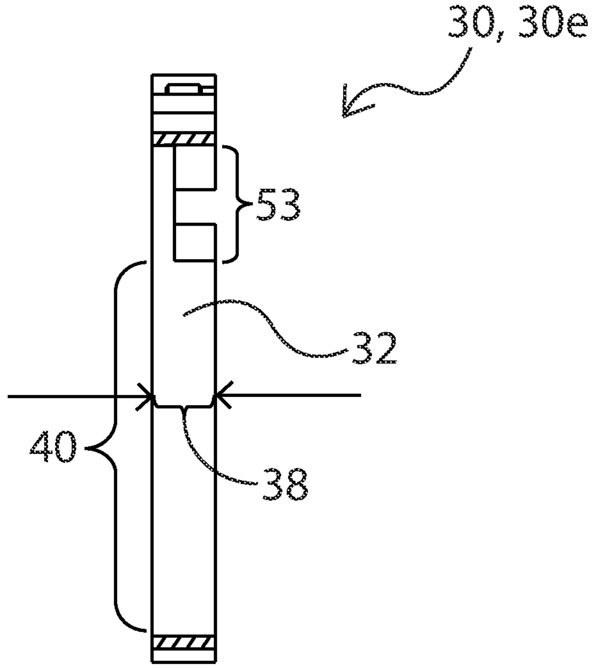
FIG. 21*b* is a sectional view alone line 21*b*-21*b* of FIG. 21*a* showing the varying thickness in the lens.
Figure 22:
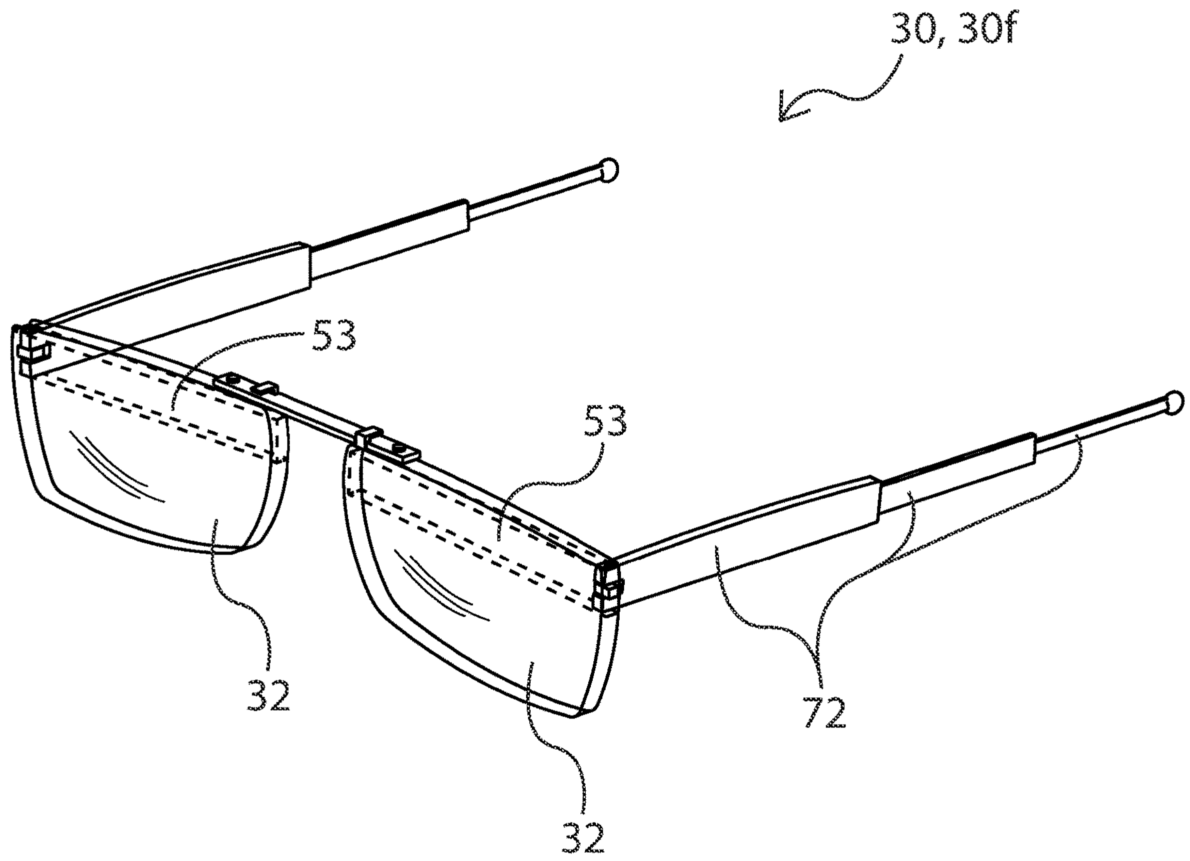
FIG. 22 is a perspective view of an embodiment of the eyewear system in FIG. 1*a*, now with z-fold nose bridge and contracting temple members directly connected to the lens.

Alternative lens arrangements may be incorporated into eyewear system 32, FIGS. 20-22. In FIG. 20, eyewear system 30*d*, frame 56 does not include cross bar 64. The contracted contracting temple member 46 folds directly above lens 32 into temple gap 53. In FIG. 21*a*, eyewear system 30*e*, lens 32 fills the whole area between surrounding member 60 and top member 62 of frame 54. FIG. 21*b* shows a sectional view where temple gap 53 has been cut into lens 32. In FIG. 22, eyewear system 30*f*, *z*-fold nose bridge 44*a* and temple hinge 52 are directly connected to lenses 32 that has a temple gap 53 formed into the lens itself.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. An eyewear system; comprising:

a) a first lens and a second lens, each lens comprising a front surface, a back surface, a width, an outer edge, a lens thickness, an active area, and a lens plane;

b) a collapsible nose bridge connecting the two lenses, wherein the collapsible nose bridge includes a z-strip and two z-pins, one z-pin connecting the z-strip to the first lens and one z-pin connecting the z-strip to the second lens; whereby when collapsing the collapsible nose bridge the z-strip pivots relative to both z-pins to fold the first lens and second lens to lie adjacent to each other and nested with one front surface adjacent the back surface of the other lens;

c) two contracting temple members, each contracting temple member includes elongated temple segments including at least one smaller diameter temple segment and at least one larger diameter temple segment, wherein smaller diameter temple segments slide within larger diameter temple segments to telescope the contracting temple member to a contracted length of temple segments that are less than or equal to the width of each lens; and d) only a single temple hinge connecting each contracting temple member at or interior to the outer edge of each lens and adjacent the active area of each lens, wherein the temple hinge includes a hinge pivot, a spring, and a detent; wherein the hinge pivot lies within the lens plane allowing the entire contracted length of the temple members to fold into the lens plane and lie completely within the lens plane in the fully collapsed state and outside the active area of each lens.

2. The eyewear system as recited in claim 1, further comprising a holding case.

3. The eyewear system as recited in claim 2, wherein the holding case is attached to a wrist band.

4. The eyewear system as recited in claim 2, wherein the holding case is attached to a necklace.

5. The eyewear system as recited in claim 2, wherein each temple member comprises a hinged end and a free end, wherein each temple member further includes a temple knob on the free end of each temple member, wherein the holding case has an opening with a grommet to accept the temple knob when the lenses and fully collapse temple members are inserted within the holding case.

6. The eyewear system as recited in claim 1, further comprising a frame, wherein temple gaps are created in the lens plane between the active area of each lens and the frame.

7. The eyewear system as recited in claim 1, wherein the collapsible nose bridge further includes two z-fold stops, wherein the z-stop includes two z-fold gaps, wherein the z-fold stops mate with the two z-fold gaps to hold the z-fold nose bridge secured in place when the lenses are fully expanded into the same plane.

* * * * *